United States Patent
Yokoyama et al.

(10) Patent No.: US 9,758,134 B2
(45) Date of Patent: Sep. 12, 2017

(54) DISK BRAKE

(75) Inventors: Tomohiro Yokoyama, Nisshin (JP); Ikuru Konno, Toyota (JP); Hiroaki Sato, Toyota (JP); Kiyoshi Kuwazuru, Mishima (JP); Takahiro Ishida, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/390,504

(22) PCT Filed: Apr. 11, 2012

(86) PCT No.: PCT/JP2012/059941
§ 371 (c)(1),
(2), (4) Date: Oct. 3, 2014

(87) PCT Pub. No.: WO2013/153643
PCT Pub. Date: Oct. 17, 2013

(65) Prior Publication Data
US 2015/0107943 A1    Apr. 23, 2015

(51) Int. Cl.
*F16D 55/22* (2006.01)
*B60T 1/06* (2006.01)
(Continued)

(52) U.S. Cl.
CPC ............ *B60T 1/065* (2013.01); *F16D 55/226* (2013.01); *F16D 55/227* (2013.01);
(Continued)

(58) Field of Classification Search
CPC ....... F16D 2055/0029; F16D 55/22655; F16D 55/227; F16D 55/2265; F16D 65/0087;
(Continued)

(56) References Cited

U.S. PATENT DOCUMENTS 5,749,445 A    5/1998    Ruiz Busquets
8,864,244 B2 *    10/2014    Leiber ...................... B60T 8/00
                                                                188/157

FOREIGN PATENT DOCUMENTS

CN         1142260 A      2/1997
DE   102004035312 A1      2/2006
(Continued)

OTHER PUBLICATIONS

Electronic Translation of EP 0168303 A1.*
Electronic Translation of DE 102005022597 A1.*

*Primary Examiner* — Anna Momper
(74) *Attorney, Agent, or Firm* — Sughrue Mion, PLLC

(57) ABSTRACT

According to an example, a disk brake is disclosed in which a caliper is supported by a mounting bracket via a slide pin, the mounting bracket being attached to a non-rotational portion of a vehicle, the disk brake comprising an electromagnet provided in connection with the slide pin, the electromagnet attracting the slide pin in an axial direction of the slide pin such that brake pads move away from a disk rotor. According to another example, a disk brake in which a caliper is supported by a mounting bracket via a slide pin, the mounting bracket being attached to a non-rotational portion of a vehicle, the disk brake comprising a magnetic material body of a backing plate of a brake pad and an electromagnet provided in a location where the electromagnet is opposed to the magnetic material body in a lateral direction of the vehicle.

3 Claims, 12 Drawing Sheets

(51) Int. Cl.
*F16D 55/226* (2006.01)
*F16D 55/2265* (2006.01)
*F16D 55/227* (2006.01)
*F16D 65/092* (2006.01)
F16D 121/20 (2012.01)
F16D 121/22 (2012.01)
F16D 129/06 (2012.01)
F16D 55/00 (2006.01)
F16D 129/08 (2012.01)

(52) U.S. Cl.
CPC ... *F16D 55/2265* (2013.01); *F16D 55/22655* (2013.01); *F16D 65/092* (2013.01); F16D 2055/0029 (2013.01); F16D 2121/20 (2013.01); F16D 2121/22 (2013.01); F16D 2129/06 (2013.01); F16D 2129/08 (2013.01)

(58) Field of Classification Search
CPC ............. F16D 65/0093; F16D 2121/20; F16D 2129/08; F16D 2129/065
See application file for complete search history.

(56) References Cited

FOREIGN PATENT DOCUMENTS

| | | | | |
|---|---|---|---|---|
| DE | 102005022597 A1 | * | 11/2006 | ....... F16D 55/22655 |
| FR | EP 0168303 A1 | * | 1/1986 | ....... F16D 55/22655 |
| JP | 3-124032 U | | 12/1991 | |
| JP | 09-507286 A | | 7/1997 | |
| JP | 10-037987 A | | 2/1998 | |
| JP | 11-241741 A | | 9/1999 | |
| JP | 11-287267 A | | 10/1999 | |
| JP | 11-325132 A | | 11/1999 | |
| JP | 2003-120725 A | | 4/2003 | |

* cited by examiner

FIG.13
(A)
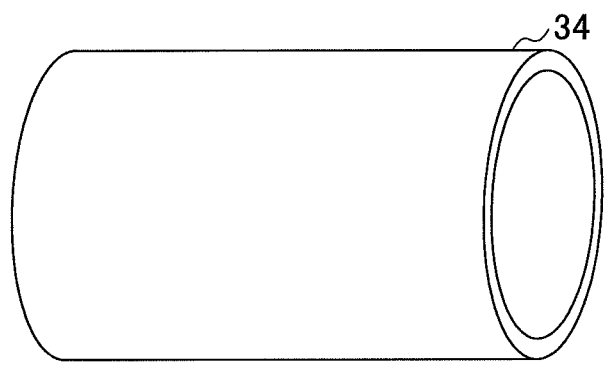
(B)
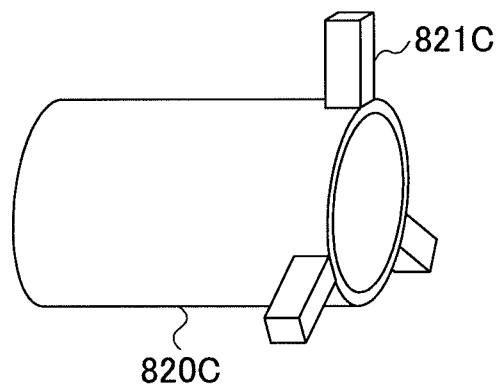

DISK BRAKE

CROSS REFERENCE TO RELATED APPLICATIONS

This application is a National Stage of International Application No. PCT/JP2012/059941, filed Apr. 11, 2012, the contents of all of which are incorporated herein by reference in their entirety.

TECHNICAL FIELD

The present invention is related to a disk brake in which a caliper is supported by a mounting bracket via a slide pin, the mounting bracket being secured to a non-rotational portion of a vehicle.

BACKGROUND ART

A disk brake is known which includes magnets provided on inner sides of pressure pads (backing plates) such that they are opposed to each other; and a solenoid provided between the magnets, wherein the pressure pads are moved away from a disk by applying the current to the solenoid after the brake operation has been released (see Patent Document 1, for example).

[Patent Document 1] Japanese Laid-open Utility Model Publication No. 03-124032 (FIG. 2)

DISCLOSURE OF INVENTION

Problem to be Solved by Invention

However, according to the configuration disclosed in Patent Document 1, there is a problem that it is not practically implemented because the design of a cylinder is restricted by the necessity for reserving a space (at the outer side of the brake rotor in a radius direction) in the cylinder in which the magnets and the solenoid are provided. Further, there is also a problem that such a configuration cannot be implemented in which a sufficient magnetic force (i.e., a force for moving the pressure pads away from the disk) can be generated in an excessively limited space in the cylinder.

Therefore, an object of the present invention is to provide a disk brake in which the mountablity of an electromagnet is increased and the brake binding is effectively reduced.

Means to Solve the Problem

According to an aspect of the present invention, a disk brake is provided in which a caliper is supported by a mounting bracket via a slide pin, the mounting bracket being secured to a non-rotational portion of a vehicle, the disk brake comprising:

an electromagnet provided in connection with the slide pin, the electromagnet attracting the slide pin in an axial direction of the slide pin such that brake pads move away from a disk rotor.

Advantage of the Invention

According to the present invention, a disk brake can be obtained in which the mountablity of an electromagnet is increased and the brake binding is effectively reduced.

BRIEF DESCRIPTION OF DRAWINGS

FIG. 13 is a diagram for illustrating an example of a way of arranging an electromagnet 800C.

DESCRIPTION OF REFERENCE SYMBOLS

Figure 1:
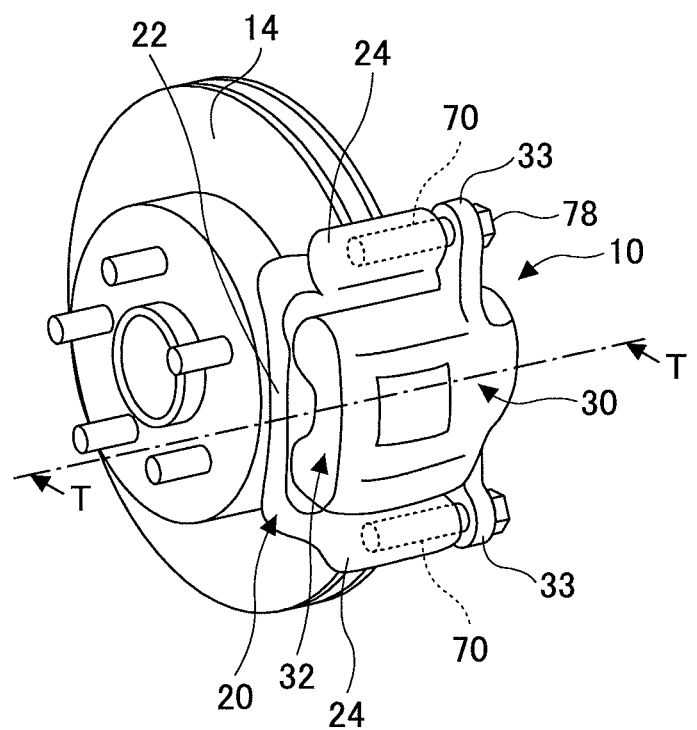
FIG. 1 is a diagram for illustrating a perspective view of an example of a disk brake 10.

10, 10A disk brake
14 disk rotor
20 mounting
22 mounting bridge part
24 slide pin accommodating portion
24a pin hole
30 cylinder
32 nail portion
34 piston
33 slide pin fixing portion
51 inner pad
51a magnet
51b backing plate
51c bar member
52 outer pad
52a magnet
52b backing plate
52c bar member
70, 700 slide pin
76 boot
80, 800, 800A-D electromagnet
82, 820, 820A-D core
84, 840, 824A-D coil
90 stepper motor
100 controller

BEST MODE FOR CARRYING OUT THE INVENTION

In the following, the best mode for carrying out the present invention will be described in detail by referring to the accompanying drawings.

Figure 2:
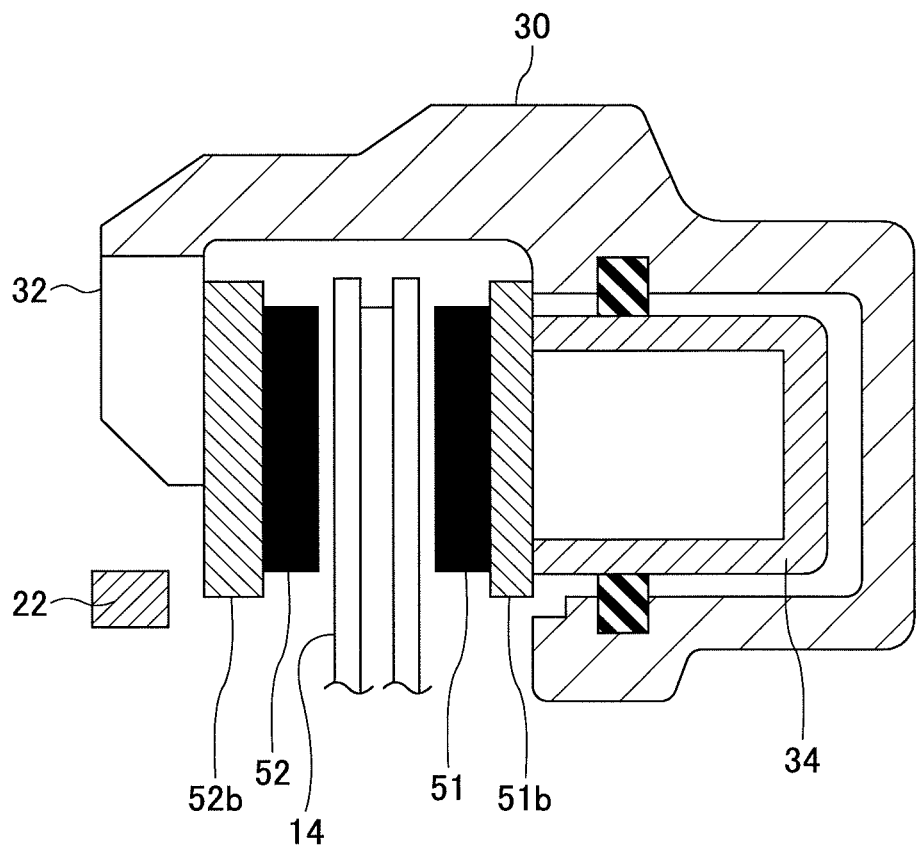
FIG. 2 is a diagram for illustrating a main cross-section view of the disk brake 10 along the line T-T in FIG. 1.

FIG. 1 is a diagram for illustrating a perspective view of an example of a disk brake 10, and FIG. 2 is a diagram for illustrating a main cross-section view of the disk brake 10 along the line T-T in FIG. 1.

The disc brake 10 includes a mounting bracket 20 (merely referred to as "a mounting 20" hereinafter). The mounting 20 is fixed to a vehicle body (a knuckle of a suspension system, for example). A cylinder body (caliper) 30 (merely referred to as "a cylinder 30" hereinafter) is attached to the mounting 20 via slide pins 70. Further, brake pads (an inner pad 51 and an outer pad 52) are supported by the mounting 20. The inner pad 51 and the outer pad 52 are arranged such that they are opposed to a disk rotor 14, which rotates with a wheel of a vehicle, from the inboard direction and the outboard direction of the vehicle, respectively.

The mounting 20 includes a mounting bridge part 22 and slide pin accommodating portions 24, as illustrated in FIG. 1. The slide pin accommodating portions 24 are located at the opposite sides of the cylinder 30 in a circumferential direction of the disk rotor 14. The slide pin accommodating portions are connected via the mounting bridge part 22. The slide pin accommodating portions 24 extend in the lateral direction (the inboard and outboard directions of the vehicle).

The cylinder 30 is attached to the mounting 20 via the slide pins 70, as described above. The cylinder 30 includes a piston 34 and a nail portion 32 which are arranged such that the piston 34 and the nail portion 32 are opposed to the inner pad 51 and the outer pad 52 from the inboard direction and the outboard direction of the vehicle, respectively. Further, the cylinder 30 includes slide pin fixing portions 33. Typically, the cylinder 30 is in fluid communication with a master cylinder (not illustrated) via a hydraulic channel. When the high-pressure fluid is supplied to the cylinder 30, the piston 34 moves toward the nail portion 32 so that the inner pad 51 and the outer pad 52 are pressed against the respective sliding surfaces of the disk rotor 14 such that the respective sliding surfaces are sandwiched between the inner pad 51 and the outer pad 52, thereby implementing the braking operation. It is noted that the disk brake 10 may be located at any angular position in the circumferential direction of the wheel with respect to the disk rotor 14. The slide pin fixing portions 33 are formed at locations where they are opposed to the slide pin accommodating portions 24 in the lateral direction of the vehicle, respectively.

Figure 3:
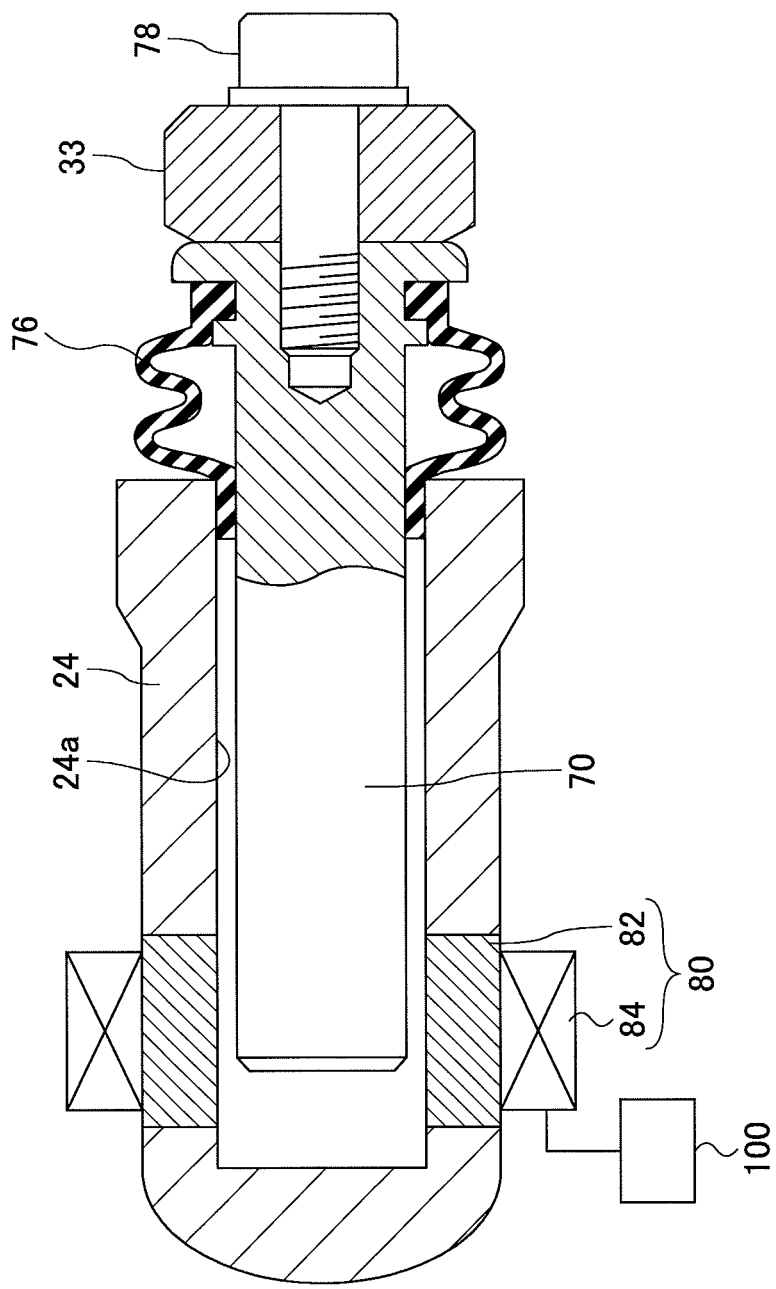
FIG. 3 is a diagram for illustrating a main cross-section view of a portion where a slide pin 70 is mounted and illustrating a status in which the slide pin 70 is in its nominal position.
Figure 4:
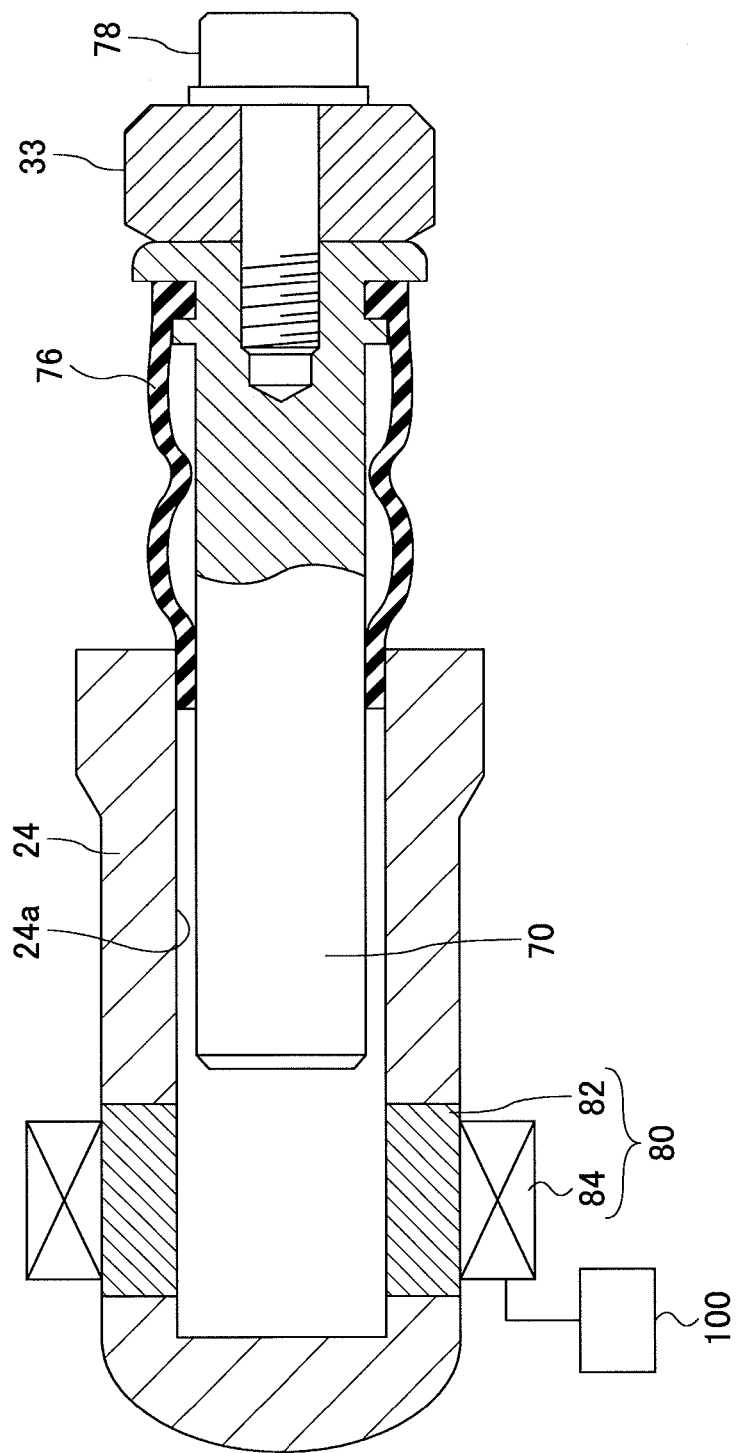
FIG. 4 is a diagram for illustrating a main cross-section view of a portion where the slide pin 70 is mounted and illustrating a status in which the slide pin 70 is in a braking position.

FIG. 3 and FIG. 4 are diagrams for illustrating an example of a brake binding reduction mechanism and illustrating a main cross-section view of a portion where the slide pin 70 is mounted. It is noted that two slide pins 70 are provided for a single disk brake 10 and the portion where one of two slide pins 70 is mounted is described here; however, the portion where another slide pin 70 is mounted may be the same. FIG. 3 illustrates a status in which the slide pin 70 is in its nominal position (non-braking position) and FIG. 4 illustrates a status in which the slide pin 70 is in the braking position. It is noted that the nominal position of the slide pin 70 may correspond to the position of the slide pin 70 when the cylinder 30 is in its normal position with respect to the mounting 20 (i.e., when the cylinder 30 is in an appropriately centralized state).

Here, prior to the explanation of the brake binding reduction mechanism, the configuration (function) of the slide pin 70 is explained first. The slide pin 70 is provided in a pin hole 24a which is formed in the slide pin accommodating portion 24 of the mounting 20, as illustrated in FIG. 3 and FIG. 4. The pin hole 24a is formed to have a radius greater than that of the slide pin 70 such that the slide pin 70 can slide in the pin hole 24a. It is noted that the inside of the pin hole 24a may be filled with grease or the like. The slide pin 70 is attached to the slide pin fixing portion 33 of the cylinder 30 by means of a bolt 78. The slide pin 70 includes a boot 76 with bellows. The boot 76 has one end attached to the slide pin accommodating portion 24 of the mounting 20 and another end attached to the end of the slide pin 70 (the end opposed to the slide pin fixing portion 33). The boot 76 has a function of protecting the exposed portion of the slide pin 70 which is out of the pin hole 24a of the slide pin accommodating portion 24. Further, the bellows of the boot 76 have a function of absorbing the variation in the length of the exposed portion of the slide pin 70 due to the sliding operation of the slide pin 70. It is noted that the configuration of the boot 76 and the way of attaching the boot 76 may be arbitrary.

As described above, when the high-pressure fluid is supplied to the cylinder 30, the piston 34 moves toward the nail portion 32 so that the inner pad 51 and the outer pad 52 are pressed against the respective sliding surfaces of the disk rotor 14 such that the respective sliding surfaces are sandwiched between the inner pad 51 and the outer pad 52, thereby implementing the braking operation. At that time, the cylinder 30 receives the reaction force from the piston 34, which causes the cylinder 30 to be moved in a direction away from the mounting (i.e., the inboard direction of the vehicle) while the slide pins 70 slide from the nominal position (see FIG. 3) to the braking position (see FIG. 4). When the operation of the brake is released, the high-pressure fluid is drained from the cylinder 30 (i.e., returned to the tank), which causes the inner pad 51 and the outer pad 52 to move away from the respective sliding surfaces of the disk rotor 14 while the slide pins 70 slide (i.e., slide from the braking position (see FIG. 4) to the nominal position (see FIG. 3). At that time, if the inner pad 51 and the outer pad 52 are not spaced appropriately from the respective sliding surfaces of the disk rotor 14, a so-called "brake binding (dragging)" occurs, resulting in poor fuel economy, etc. In the following, the brake binding reduction mechanism for reducing the brake binding is described mainly.

In the example illustrated in FIG. 3, the brake binding reduction mechanism includes an electromagnet 80 provided in connection with the slide pin 70. The electromagnet 80 is provided in the slide pin accommodating portion 24 of the mounting 20. The electromagnet 80 includes a cylindrical (hollow) core 82 and a coil 84 wound around the outer surface of the core 82. The cylindrical core 82 is formed from the magnetic material. The cylindrical core 82 may be an iron member, multi-layered steel sheets, or a compression molding member formed from powder magnetic materials. It is noted that the cylindrical core 82 may be integrally formed with the slide pin accommodating portion 24, or the cylindrical core 82 may be formed separately from the slide pin accommodating portion 24 and then attached to the slide pin accommodating portion 24 to be integral with it.

The electromagnet 80 is provided at the tip side (the end of the outboard side) of the slide pin 70. It is preferred that the cylindrical core 82 and the slide pin 70 are arranged such that the tip portion of the slide pin 70 enters the hollow internal space of the cylindrical core 82 when the slide pin 70 is in its nominal position, as illustrated in FIG. 3. In this case, the electromagnet 80 can attract the tip side (the end of the outboard side) of the slide pin 70 into the hollow internal space of the cylindrical core 82 at the time of applying the current to the electromagnet 80. Further, the cylindrical core 82 and the slide pin 70 may be arranged such that the tip portion of the slide pin 70 goes out of the hollow internal space of the cylindrical core 82 when the slide pin 70 is in the braking position, as illustrated in FIG. 4.

The electromagnet 80 is controlled by means of a controller (ECU) 100. The controller 100 may control the current applied to the electromagnet 80 in conjunction with the operation of the brake. For example, the controller 100 keeps not applying the current to the electromagnet 80 in a nominal state while it applies the current to the electromagnet 80 if the status of the brake changes from the operation status to the non-operation status (released status). As described above, when the current is applied to the electromagnet 80, the electromagnet 80 generates the magnetic force to attract the tip side (the end of the outboard side) of the slide pin 70 into the hollow internal space of the cylindrical core 82. In this way, it is possible to reduce the brake binding which could occur at the time of releasing the brake.

It is noted that the controller 100 may apply the current to the electromagnet 80 whenever the brake is released, or the controller 100 may apply the current to the electromagnet 80 every predetermined number of times of the brake releasing operation. Further, the controller 100 may apply the current to the electromagnet 80 on a regular basis or on an irregular basis at the time of releasing the brake. Further, the controller 100 may control the current applied to the electromagnet not in conjunction with the operation of the brake. For example, the controller 100 may temporarily apply the current to the electromagnet 80 when the ignition switch is tuned on or off. With this arrangement, it is possible to reduce the locking (sticking) of the slide pin 70 at the braking position (see FIG. 4) or at the position near the braking position.

Figure 5:
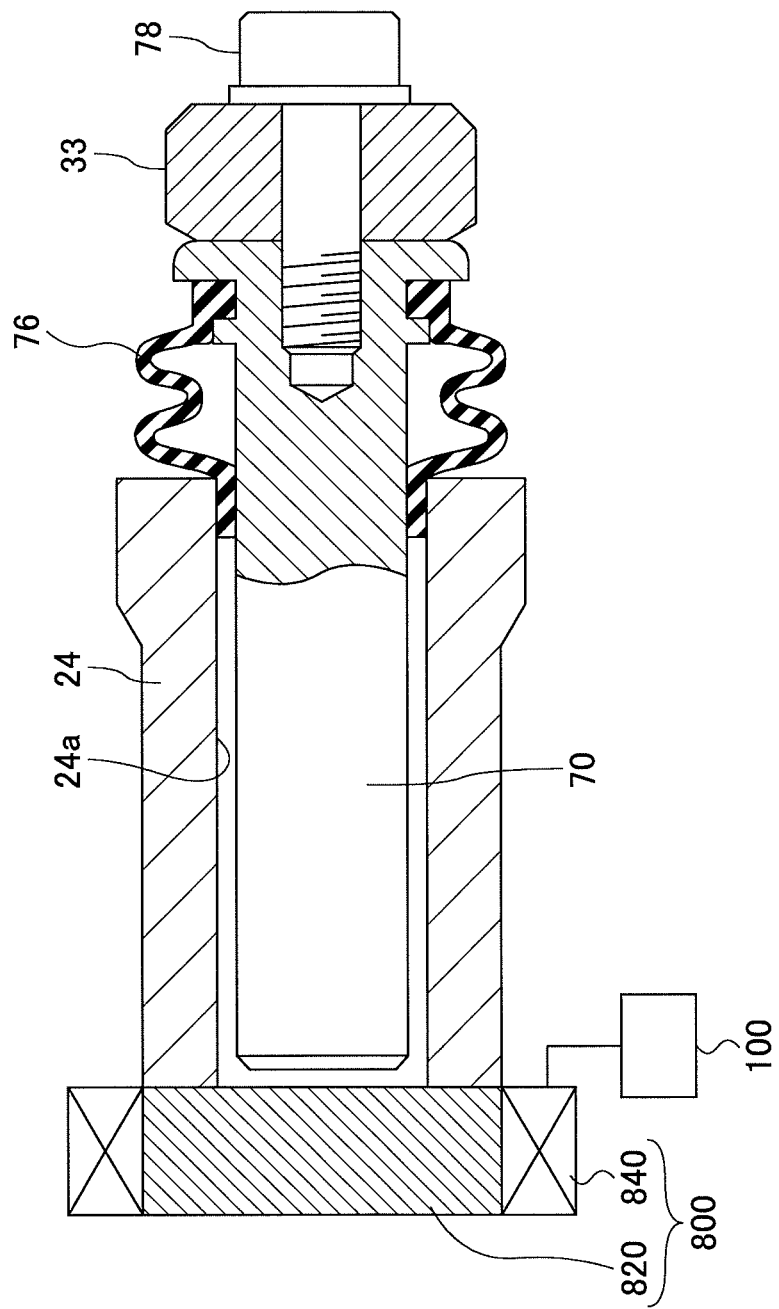
FIG. 5 is a diagram for illustrating another example of an arrangement of an electromagnet 800.

FIG. 5 is a diagram for illustrating another example of an arrangement of an electromagnet 800. It is noted that FIG. 5 illustrates a status in which the slide pin 70 is in its nominal position (non-braking position), as is the case with FIG. 3.

In the example illustrated in FIG. 5, an electromagnet 800 includes a solid core 820 and a coil 840 wound around the outer surface of the core 820. Similarly, the core 820 is formed from the magnetic material. The core 820 may be an iron member, multi-layered steel sheets, or a compression molding member formed from powder magnetic materials. It is noted that the core 820 may be formed separately from the slide pin accommodating portion 24 and then attached to the slide pin accommodating portion 24 to be integral with it.

The electromagnet 800 is provided at the tip side (the end of the outboard side) of the slide pin 70. It is preferred that the core 820 is arranged such that the tip portion of the slide pin 70 comes close to the end surface of the core 820 (or comes into contact with the end surface of the core 820) when the slide pin 70 is in its nominal position, as illustrated in FIG. 5. In this case, the electromagnet 800 can attract the tip side (the end of the outboard side) of the slide pin 70 toward end surface of the core 820 at the time of applying the current to the electromagnet 800.

The electromagnet 800 is controlled by means of a controller 100. The control of the electromagnet 800 may be the same as the control of the electromagnet 80 described above.

In this way, according to the brake binding reduction mechanism illustrated in FIG. 3 through FIG. 5, by forcefully moving the slide pin 70 with means of the electromagnetic force of the electromagnet 80 or 800, the brake binding at the time of releasing the brake or the locking of the slide pin 70 can be reduced with reliability. Further, the electromagnet 80 or 800 is mounted on the slide pin accommodating portion 24 of the mounting 20, the mountablity is good, and it does not provide a significant restriction on the design of the cylinder 30. Further, since the electromagnet 80 or 800 can be arranged such that the electromagnetic force directly acts on the slide pin 70, the necessary electromagnetic can be generated without upsizing of the electromagnet 80 or 800.

It is noted that, in the embodiments illustrated in FIG. 3 through FIG. 5, the slide pin 70 may be formed from a material (a magnetic material, for example) which can be attracted by the electromagnetic force of the electromagnet 80 or 800. Further, the tip portion of the slide pin 70 may be formed from a material that is different from the material of the remaining portion so that the slide pin 70 can be attracted more strongly by the electromagnetic force of the electromagnet 80 or 800. For example, only the tip portion of the slide pin 70 may be formed from the magnetic material (including the hard magnetic materials).

Figure 6:
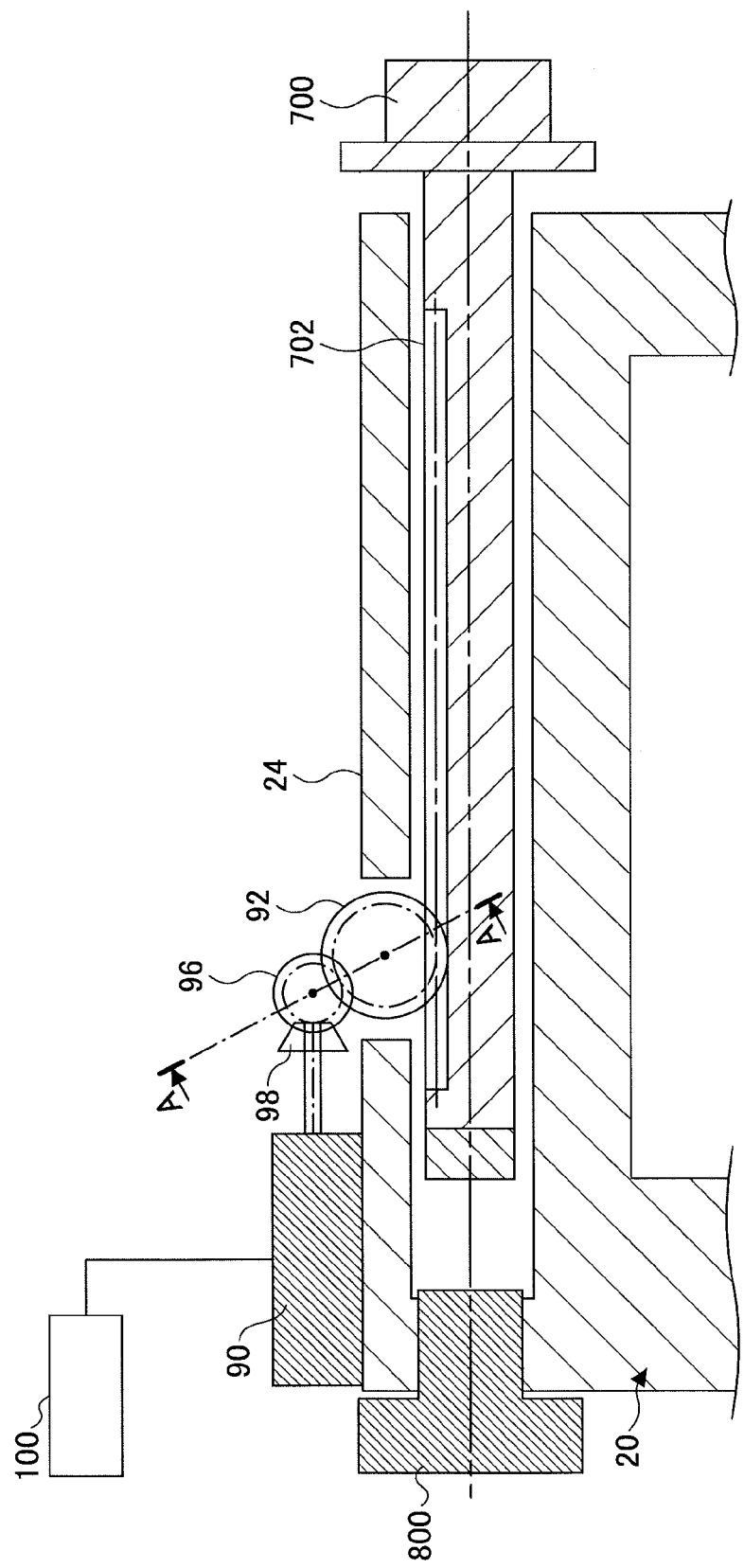
FIG. 6 is a diagram for illustrating an example of a slide pin position controlling mechanism.
Figure 7:
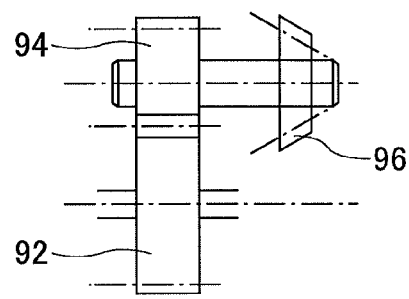
FIG. 7 is a diagram for illustrating a cross-section view along a line A-A in FIG. 6.

FIG. 6 is a diagram for illustrating an example of a slide pin position controlling mechanism. FIG. 7 is a diagram for illustrating a cross-section view along a line A-A in FIG. 6. It is noted that in the cross-section view of FIG. 6 some parts except for the slide pin position controlling mechanism are illustrated differently with respect to the cross-section views of the FIG. 3 through FIG. 5; however, the difference is not substantial. It is noted that, in the example illustrated in FIG. 6, the electromagnet 800 as the brake binding reduction mechanism is attached to the end of the slide pin accommodating portion 24; however, the electromagnet 80 may be used instead of the electromagnet 800.

The slide pin position controlling mechanism includes a stepper motor 90. The stepper motor 90 is provided in the slide pin accommodating portion 24 of the mounting 20. In other words, the non-rotational part (a casing, for example) of the stepper motor 90 is fixed to the slide pin accommodating portion 24 of the mounting 20.

Further, the slide pin position controlling mechanism includes a rack 702 formed in the slide pin 700. The rack 702 is engaged with a pinion 92. The pinion 92 is engaged with a counter gear 94, as illustrated in FIG. 7. Further, a wheel gear 96 is provided such that it has its rotation axis coaxial with the rotation axis of the counter gear 94 and the wheel gear 96 rotates with the counter gear 94, as illustrated in FIG. 7. The wheel gear 96 is engaged with a wheel gear 98 which has its rotation axis perpendicular to the rotation axis of the counter gear 94, as illustrated in FIG. 6. In other words, the wheel gear 96 and the wheel gear 98 functions as bevel gears. The wheel gear 98 is provided such that its rotation axis is coaxial with the rotation axis of the stepper motor 90. In other words, the wheel gear 98 rotates around the rotation axis of the stepper motor 90. Thus, the linear motion of the slide pin 700 (the motion at the time of sliding) is converted to the rotary motion by the pinion 92, and the rotary motion has the rotation axis changed by 90 degrees by the wheel gear 96 and the wheel gear 98 to be transmitted to the rotation axis (motor shaft) of the stepper motor 90.

The stepper motor 90 is controlled by means of a controller 100. It is noted that the controller 100 may be the same controller which controls the electromagnet 800 or a different controller. As described above, the linear motion of the slide pin 700 is converted to the rotary motion by the pinion 92, and the rotary motion has the rotation axis changed by 90 degrees by the wheel gear 96 and the wheel gear 98 to be transmitted to the rotation axis of the stepper motor 90. The controller 100 detects the rotation position of the stepper motor 90 (i.e., the rotation position of the rotor) to detect the position of the slide pin 70 during the application of the current to the electromagnet 800. The controller 100 generates the counterforce (rotation torque) if the rotation position of the stepper motor 90 becomes a predetermined position (a predetermined angle). The counterforce acts to stop the further movement of the slide pin 700. The magnitude of the counterforce is sufficient enough to stop the further movement of the slide pin 700. The predetermined position (predetermined angle) of the stepper motor 90 may correspond to the nominal position of the slide pin 700. With this arrangement, it becomes possible to reduce the problem (brake binding of the inner pad 51 on the inboard side) which could occur when the slide pin 700 is attracted excessively by the electromagnet 800 such that it goes beyond the nominal position.

Next, another embodiment (second embodiment) in which the brake binding reduction mechanism is provided in connection with the brake pads (the inner pad 51 and the outer pad 52) is described. It is noted that in the following a preferred embodiment in which the brake binding reduction mechanisms are provided for both of the inner pad 51 and the outer pad 52; however, the brake binding reduction mechanism may be provided for any one of the inner pad 51 and the outer pad 52.

Figure 8:
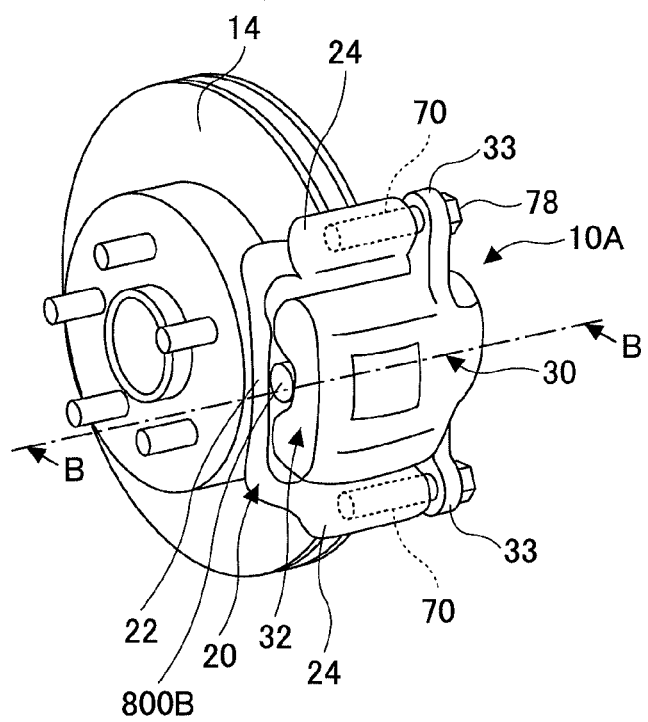
FIG. 8 is a diagram for illustrating a perspective view of an example of a disk brake 10A according to a second embodiment.
Figure 9:
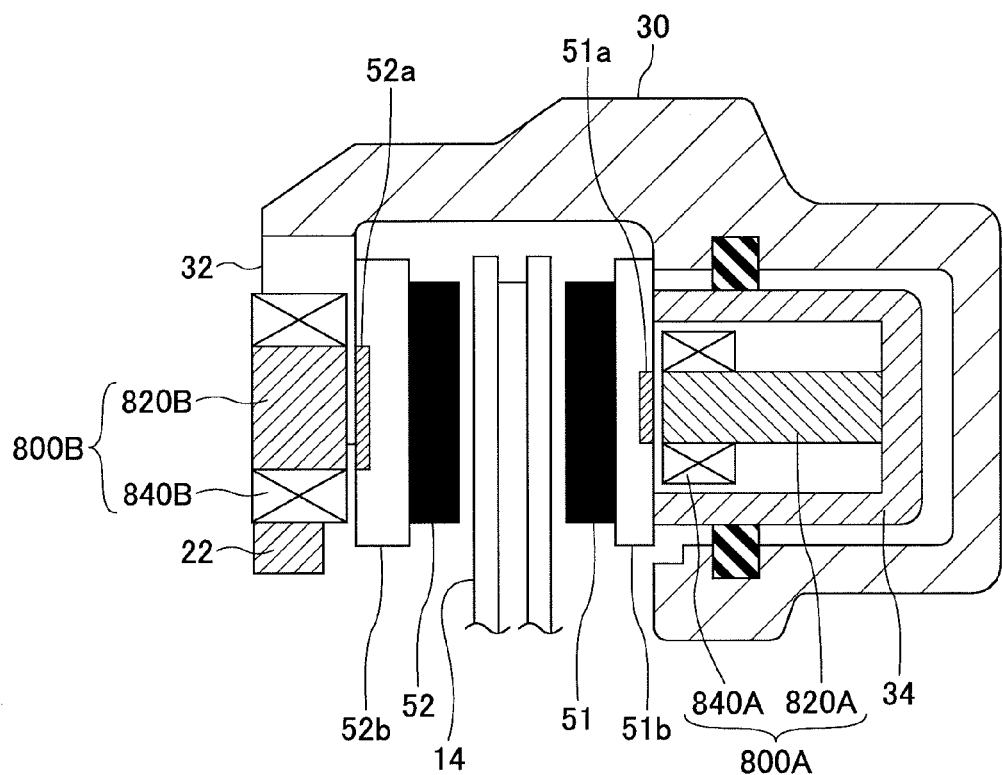
FIG. 9 is a diagram for illustrating a main cross-section view of the disk brake 10A along the line B-B in FIG. 8.
Figure 10:
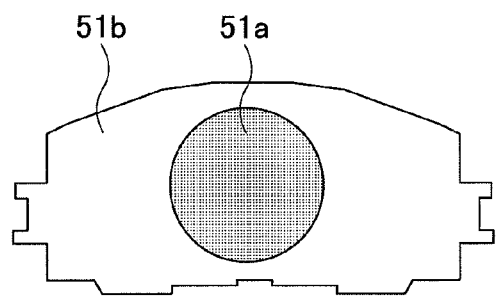
FIG. 10 is a diagram for illustrating a plan view of the backside (opposed to a piston 34) of a backing plate 51b of an inner pad 51.

FIG. 8 is a diagram for illustrating a perspective view of an example of a disk brake 10A according to the second embodiment, and FIG. 9 is a diagram for illustrating a main cross-section view of the disk brake 10A along the line B-B in FIG. 8. FIG. 10 is a diagram for illustrating a plan view of the backside (opposed to the piston 34) of a backing plate 51b of the inner pad 51.

In the example illustrated in FIG. 8 and FIG. 9, the brake binding reduction mechanism includes electromagnet 800A and 800B which are provided for the inner pad 51 and the outer pad 52, respectively.

The electromagnet 800A is supported by (attached to) the piston 34, as illustrated in FIG. 9. The electromagnet 800A is disposed utilizing a space in the piston 34. Thus, the electromagnet 800A can be disposed at a position where the electromagnet 800A is opposed to a center of the figure of the back side (backing plate 51b) of the inner pad 51 in the lateral direction of the vehicle.

The electromagnet 800A includes a solid core 820A and a coil 840A wound around the outer surface of the core 820A. The core 820A is formed from the magnetic material. The core 820A may be an iron member, multi-layered steel sheets, or a compression molding member formed from powder magnetic materials.

The electromagnet 800A is controlled by means of a controller 100. The controller 100 may control the current applied to the electromagnet 800A in conjunction with the operation of the brake. For example, the controller 100 keeps not applying the current to the electromagnet 800A in a nominal state while it applies the current to the electromagnet 800A if the status of the brake changes from the operation status to the non-operation status. When the current is applied to the electromagnet 800A, the electromagnet 800A generates a magnetic force to attract the backing plate 51b of the inner pad 51 (and thus the inner pad 51) toward the core 820A. In this way, it is possible to reduce the brake binding which could occur at the time of releasing the brake.

It is noted that the controller 100 may apply the current to the electromagnet 800A whenever the brake is released, or the controller 100 may apply the current to the electromagnet 800A every predetermined number of times of the brake releasing operation. Further, the controller 100 may apply the current to the electromagnet 800A on a regular basis or on an irregular basis at the time of releasing the brake.

The electromagnet 800B is supported by (secured to) the mounting bridge part 22 of the mounting 20, as illustrated in FIGS. 8 and 9. The electromagnet 800B is disposed utilizing a space (i.e., a space between two nails) in a concave portion of the nail portion 32 of the cylinder 30, as illustrated in FIG. 8. Thus, the electromagnet 800B can be disposed at a position where the electromagnet 800B is opposed to a center of the figure of the back side (backing plate 52b) of the outer pad 52.

The electromagnet 800B includes a solid core 820B and a coil 840B wound around the outer surface of the core 820B. The core 820B is formed from the magnetic material. The core 820B may be an iron member, multi-layered steel sheets, or a compression molding member formed from powder magnetic materials. It is noted that the electromagnet 800B may be configured as a unit incorporated in a casing. In this case, this unit may be fixed to the mounting bridge part 22 of the mounting 20 to be integrated with the mounting bridge part 22.

The electromagnet 800B is controlled by means of a controller 100. The controller 100 may control the current applied to the electromagnet 800B in conjunction with the operation of the brake. For example, the controller 100 keeps not applying the current to the electromagnet 800B in a nominal state while it applies the current to the electromagnet 800B if the status of the brake changes from the operation status to the non-operation status. When the current is applied to the electromagnet 800B, the electromagnet 800B generates a magnetic force to attract the backing plate 52b of the outer pad 52 (and thus the outer pad 52) toward the core 820B. In this way, it is possible to reduce the brake binding which could occur at the time of releasing the brake.

It is noted that the controller 100 may apply the current to the electromagnet 800B whenever the brake is released, or the controller 100 may apply the current to the electromagnet 800B every predetermined times of the brake releasing operation. Further, the controller 100 may apply the current to the electromagnet 800B on a regular basis or on an irregular basis at the time of releasing the brake. However, preferably, the application of the current to the electromagnet 800B is synchronized with the application of the current to the electromagnet 800A.

In this way, according to the brake binding reduction mechanism illustrated in FIG. 8, by forcefully moving the inner pad 51 and the outer pad 52 with means of the electromagnetic forces of the electromagnets 800A and 800B, the brake binding at the time of releasing the brake can be reduced with reliability. Further, the electromagnets 800A and 800B are mounted utilizing the existing space, the mountablity is good, and it does not provide a significant restriction on the design of the cylinder 30. Further, because the electromagnets 800A and 800B can be disposed such that the electromagnetic forces directly act on the inner pad 51 and the outer pad 52 (i.e., the backing plates 51b and 52b), necessary electromagnetic forces can be generated without increasing their sizes.

It is noted that, in the embodiment illustrated in FIG. 8, the backing plates 51b and 52b of the inner pad 51 and the outer pad 52 may be formed from a magnetic material (iron, for example) that is attracted by the electromagnetic forces of the electromagnets 800A and 800B.

Further, the backing plates 51b and 52b of the inner pad 51 and the outer pad 52 each may have a portion at the center of the figure, which is formed from a material that is different from a material of the remaining portion, so that the backing plates 51b and 52b of the inner pad 51 and the outer pad 52 can be attracted more strongly by the electromagnetic forces of the electromagnets 800A and 800B. For example, as illustrated in FIG. 9 and FIG. 10, the backing plate 51*b* of the inner pad 51 has a magnet 51*a* attached thereto at a position that corresponds to the center of the figure of the inner pad 51. The magnet 51*a* may be fixed to the surface of the backing plate 51*b* or embedded in a concave portion that may be formed in the backing plate 51*b*. It is noted that this holds true for a magnet 52*a* of the backing plate 52*b* of the outer pad 52. The magnet 51*a* and 52*a* may be disposed at positions that are not the centers of figures of the inner pad 51 and the outer pad 52 (i.e., the positions that are slightly shifted from the centers of figures), considering a change in contact pressures at frictional surfaces of the inner pad 51 and the outer pad 52, etc. Thus, "corresponding to the center of the figure" covers a concept including a position slightly shifted from the center of the figure.

In this way, by disposing the magnets 51*a* and 52*a* at the positions that correspond to the centers of figures of the inner pad 51 and the outer pad 52, respectively, and disposing the electromagnets 800A and 800B at the positions that are opposed to the magnets 51*a* and 52*a* in a lateral direction of the vehicle, the inner pad 51 and the outer pad 52 can be moved away from the sliding surfaces of the disk rotor 14 at the time of operating the electromagnets 800A and 800B such that a distance from the sliding surfaces is uniform over the inner pad 51 and the outer pad 52 as a whole. Thus, it is possible to reduce the brake binding which could occur when inner peripheral sides or outer peripheral sides of the inner pad 51 and the outer pad 52 are inclined due to uneven tensions.

For this reason, it is preferred that the core 820A of the electromagnet 800A is disposed such that the backing plate 51*b* (or the magnet 51*a* attached to the backing plate 51*b*) of the inner pad in its nominal position (regular non-braking position) comes closer to (or makes contact with) the end surface of the core 820A, as illustrated in FIG. 9. In this case, the electromagnet 800A can attract the inner pad 51 toward the end surface of the core 820A more strongly when the current is applied to the electromagnet 800A. Similarly, it is preferred that the core 820B of the electromagnet 800B is disposed such that the backing plate 52*b* (or the magnet 52*a* attached to the backing plate 52*b*) of the outer pad 52 in its nominal position (regular non-braking position) comes closer to (or makes contact with) the end surface of the core 820B, as illustrated in FIG. 9. In this case, the electromagnet 800B can attract the outer pad 52 toward the end surface of the core 820B more strongly when the current is applied to the electromagnet 800B.

It is noted that if the magnets 51*a* and 52*a* are provided, the backing plates 51*b* and 52*b* may be formed from a non-magnetic material. Further, if the backing plates 51*b* and 52*b* may be formed from a non-magnetic material, only areas of the backing plates 51*b* and 52*b* (i.e., areas that are opposed to the cores 820A and 820B of the electromagnets 800A and 800B in a lateral direction of the vehicle) where the magnet 51*a* and 52*a* are disposed may be formed from a soft magnetic material instead of hard magnetic material.

Figure 11:
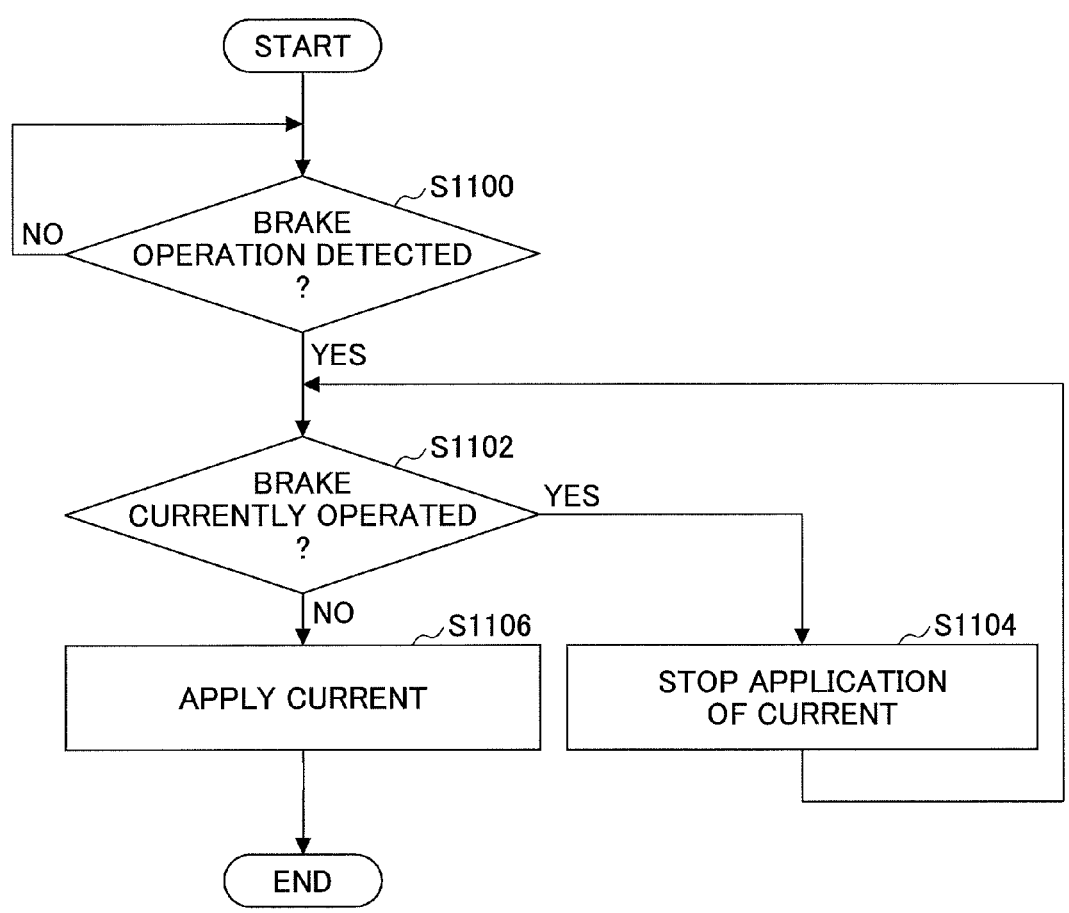
FIG. 11 is an example of a flowchart of a main process executed by a controller 100.

FIG. 11 is an example of a flowchart of a main process executed by the controller 100. It is noted that the function of the controller 100 may be implemented by other ECU(s) (a brake ECU, for example) or may be implemented in cooperation with other ECU(s).

In step 1100, it is determined whether a brake operation is detected. The presence or absence of the brake operation may be determined based on a brake switch of a brake pedal, a master cylinder pressure sensor, etc. If the brake operation is detected, the process routine goes to step 1102.

In step 1102, it is determined whether the brake is currently operated. Whether the brake is currently operated may be determined based on a brake switch of a brake pedal, a master cylinder pressure sensor, wheel cylinder pressure sensors, etc. If the brake is currently operated, the process routine goes to step 1104, and otherwise, that is to say, the brake operation has been released, the process routine goes to step 1106.

In step 1104, the application of the current to the electromagnets 800A and 800B is stopped, and then the process routine goes returns to step 1102. It is noted that if the current is not currently applied to the electromagnets 800A and 800B, the process routine goes returns to step 1102 as it is. In this way, during the brake being operated, the electromagnets 800A and 800B are not operated, and thus the electromagnets 800A and 800B do not obstruct the inner pad 51 and the outer pad 52 being pressed against the sliding surfaces of the disk rotor 14.

In step 1106, the current with a predetermined magnitude is applied to the electromagnets 800A and 800B. As a result of this, the electromagnetic forces are generated by the electromagnets 800A and 800B, and the inner pad 51 and the outer pad 52 are attracted to the cores 820A and 820B of the electromagnets 800A and 800B, respectively. In this way, the inner pad 51 and the outer pad 52 are appropriately moved away from the sliding surfaces of the disk rotor 14 at the time of releasing the brake.

It is noted that the process routine illustrated in FIG. 11 is related to the brake binding reduction mechanisms illustrated in FIG. 8; however, the same process procedure may be applied to the brake binding reduction mechanism provided for the slide pin 70 illustrated in FIG. 3 through FIG. 5 as well as other binding reduction mechanisms as describe hereinafter.

Figure 12:
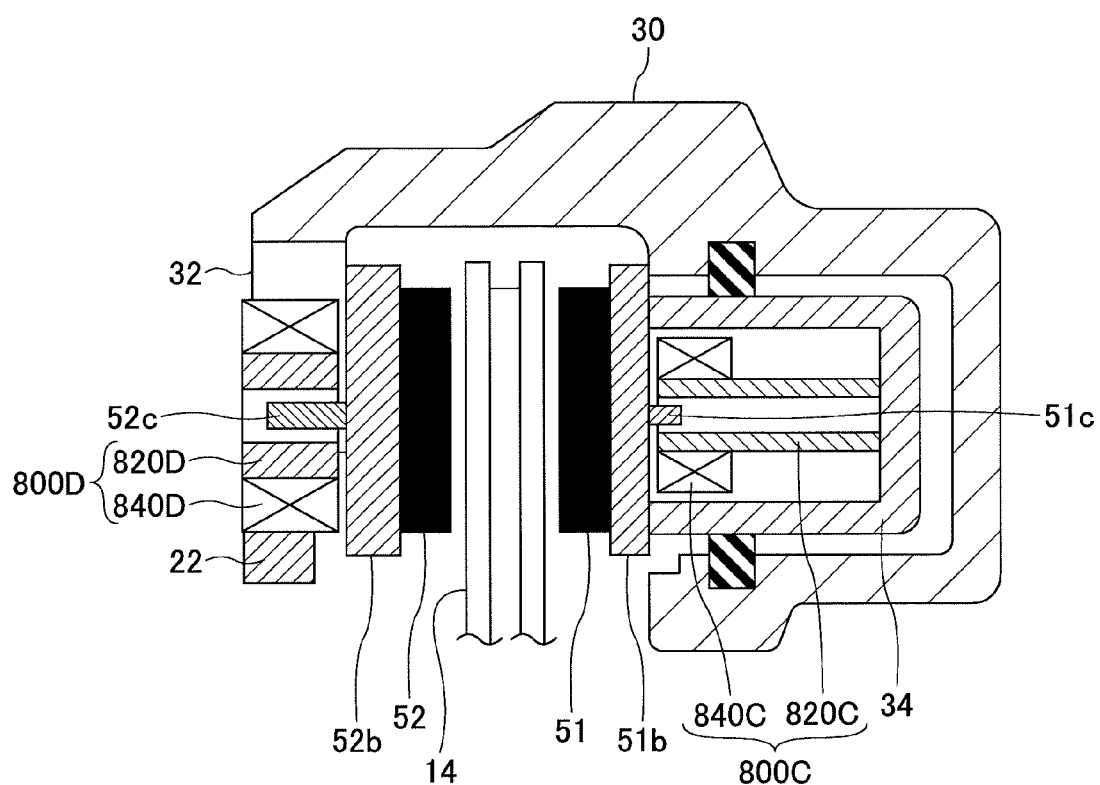
FIG. 12 is a diagram for illustrating another example of a brake binding reduction mechanism using a cross-section view of the disk brake 10A along the line B-B in FIG. 8.
Figure 14:
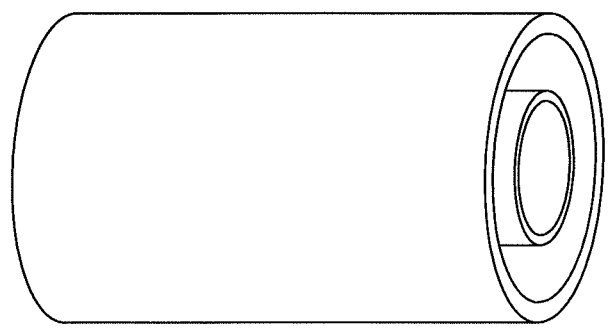
FIG. 14 is a diagram for illustrating an example of a way of arranging the electromagnet 800C.

FIG. 12 is a diagram for illustrating another example of a brake binding reduction mechanism using a cross-section view of the disk brake 10A along the line B-B in FIG. 8. FIG. 13 and FIG. 14 are diagrams for illustrating an example of a way of arranging the electromagnet 800C. The embodiment illustrated in FIG. 12 differs from the embodiment illustrated in FIG. 9 in that the electromagnets 800A and 800B are replaced with electromagnets 800C and 800D. The embodiment illustrated in FIG. 12 differs from the embodiment illustrated in FIG. 9 in that the magnets 51*a* and 52*a* are replaced with bar members 51*c* and 52*c*.

Specifically, the electromagnet 800C is supported by (attached to) the piston 34, as illustrated in FIG. 12. The electromagnet 800C is disposed utilizing a space in the piston 34. Thus, the electromagnet 800C can be disposed at a position where the electromagnet 8000 is opposed to a center of the figure of the back side (backing plate 51*b*) of the inner pad 51 in the lateral direction of the vehicle.

The electromagnet 800C includes a hollow (cylindrical) core 820C and a coil 840C wound around the outer surface of the core 820C. The core 820C is formed from the magnetic material. The core 820C may be an iron member, multi-layered steel sheets, or a compression molding member formed from powder magnetic materials.

The core 820C may be fixed to the piston 34 by means of nails fitted in the hollow piston 34, as illustrated in FIG. 13. In this case, the core 820C may be installed in the piston 34 after the coil 840C has been wound around the outer surface of the core 820C. Further, the core 820C may be formed at the time of casting of the piston 34, as illustrated in FIG. 14. In other words, the core 820C may be made by casting integrally with the piston 34 as an inner cylinder inside the piston 34. In this case, the coil 840C is wound around the outer surface of the core 820C in the piston 34 that is made by casing.

The electromagnet 820D is supported by (attached to) the mounting bridge part 22 of the mounting 20. As is the case with the electromagnet 800B, the electromagnet 800D is disposed utilizing a space in a concave portion of the nail portion 32 of the cylinder 30. Thus, the electromagnet 800D can be disposed at a position where the electromagnet 800D is opposed to a center of the figure of the back side (backing plate 52b) of the outer pad 52.

The electromagnet 800D includes a hollow (cylindrical) core 820D and a coil 840D wound around the outer surface of the core 820D. The core 820D is formed from the magnetic material. The core 820D may be an iron member, multi-layered steel sheets, or a compression molding member formed from powder magnetic materials. It is noted that the electromagnet 800D may be configured as a unit incorporated in a casing. In this case, this unit may be fixed to the mounting bridge part 22 of the mounting 20 to be integrated with the mounting bridge part 22.

It is noted that, in the embodiment illustrated in FIG. 12, the backing plates 51b and 52b of the inner pad 51 and the outer pad 52 may be formed from a magnetic material (iron, for example) that is attracted by the electromagnetic forces of the electromagnets 800C and 800D.

The backing plates 51b and 52b of the inner pad 51 and the outer pad 52 may have bar members 51c and 52c attached at the centers of figure thereof so that the backing plates 51b and 52b of the inner pad 51 and the outer pad 52 are attracted more strongly by the electromagnetic forces of the electromagnets 800C and 800D. The bar members 51c and 52c may be disposed at positions that are not the centers of figures of the inner pad 51 and the outer pad 52 (i.e., the positions that are slightly shifted from the centers of figure), considering a change in contact pressures at frictional surfaces of the inner pad 51 and the outer pad 52, etc. Thus, "corresponding to the center of the figure" covers a concept including a position slightly shifted from the center of the figure.

In this way, by disposing the bar members 51c and 52c at the positions that correspond to the centers of figures of the inner pad 51 and the outer pad 52, respectively, and disposing the electromagnets 800C and 800D at the positions that are opposed to the bar members 51c and 52c in a lateral direction of the vehicle, the inner pad 51 and the outer pad 52 can be moved away from the sliding surfaces of the disk rotor 14 at the time of operating the electromagnets 800C and 800D such that a distance from the sliding surfaces is uniform over the inner pad 51 and the outer pad 52 as a whole. Thus, it is possible to reduce the brake binding which could occur when inner peripheral sides or outer peripheral sides of the inner pad 51 and the outer pad 52 are inclined.

It is noted that the bar members 51c and 52c may be fixed to the baking plates 51b and 52b, respectively, by any ways. For example, holes to which the bar members 51c and 52c are fixed may be formed in the baking plates 51b and 52b. Further, the bar members 51c and 52c may be formed from a material (a magnetic material, for example) which can be attracted by the electromagnetic forces of the electromagnets 800C and 800D. Further, the tip portions (on free end side) of the bar members 51c and 52c may be formed from a material that is different from the material of the remaining portion so that the bar members 51c and 52c can be attracted more strongly by the electromagnetic forces of the electromagnets 800C and 800D. For example, only the tip portions of the bar members 51c and 52c may be formed from the magnetic material (including the hard magnetic materials).

The bar member 51c and the cylindrical core 820C are arranged in such a relationship that the tip of the bar member 51c in its nominal position enters the hollow internal space of the cylindrical core 820C. In this case, the electromagnet 800C can attract the tip side (free end side) of the bar member 51c into the hollow internal space of the cylindrical core 820C at the time of applying the current to the electromagnet 800C. Further, the bar member 51c and the cylindrical Core 820C are arranged in such a relationship that the tip of the bar member 51c in the braking position exits from the hollow internal space of the cylindrical core 820C.

Similarly, the bar member 52c and the cylindrical core 820D are arranged in such a relationship that the tip of the bar member 52c in its nominal position enters the hollow internal space of the cylindrical core 820D. In this case, the electromagnet 800D can attract the tip side (free end side) of the bar member 52c into the hollow internal space of the cylindrical core 820D at the time of applying the current to the electromagnet 800D. Further, the bar member 52c and the cylindrical core 820D are arranged in such a relationship that the tip of the bar member 52c in the braking position exits from the hollow internal space of the cylindrical core 820D.

The electromagnets 800C and 800D are controlled by means of the controller 100. The way of controlling the electromagnets 800C and 800D may be the same as the way described above with reference to the electromagnets 800A and 800B (see FIG. 11).

The present invention is disclosed with reference to the preferred embodiments. However, it should be understood that the present invention is not limited to the above-described embodiments, and variations and modifications may be made without departing from the scope of the present invention.

For example, in the embodiments described above, the brake binding reduction mechanisms may be used in combination. For example, the brake binding reduction mechanism provided for the slide pin 70 may be used in combination with the brake binding reduction mechanisms provided for the inner pad 51 and the outer pad 52. Further, the binding reduction mechanisms described above may be used in combination with any other binding reduction mechanism (a binding reduction mechanism utilizes an elastic force of a spring, a negative pressure in the slide pin 70, etc., to return to the nominal position, for example).

The invention claimed is:

1. A disk brake in which a caliper is supported by a mounting bracket via a slide pin, the mounting bracket being attached to a non-rotational portion of a vehicle, the disk brake comprising:
   an electromagnet provided in connection with the slide pin,
   wherein the electromagnet is configured to generate a magnetic force when a current is applied to the electromagnet upon a transition from a brake operating state to a brake non-operating state, and
   the magnetic force attracts the slide pin in an axial direction of the slide pin such that brake pads move away from a disk rotor.

2. The disk brake of claim 1, wherein the electromagnet is a hollow-type electromagnet with a hollow internal space into which an end of the slide pin is attracted at the time of applying a current to the electromagnet.

3. A disk brake in which a caliper is supported by a mounting bracket via a slide pin, the mounting bracket being attached to a non-rotational portion of a vehicle, the disk brake comprising:
  a controller,
  an electromagnet provided in connection with the slide pin,
  wherein the controller is configured to apply current to the electromagnet when the disk brake changes from a brake operating state to a brake non-operating state, generating a magnetic force, and
  the magnetic force attracts the slide pin in an axial direction of the slide pin such that brake pads move away from a disk rotor.

* * * * *